T. RYAN.
WAGON END GATE.
APPLICATION FILED SEPT. 9, 1914.
1,156,182.
Patented Oct. 12, 1915.
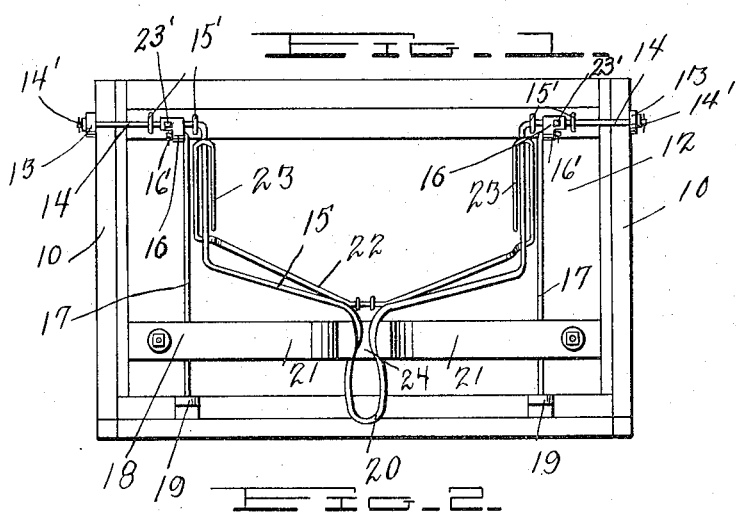
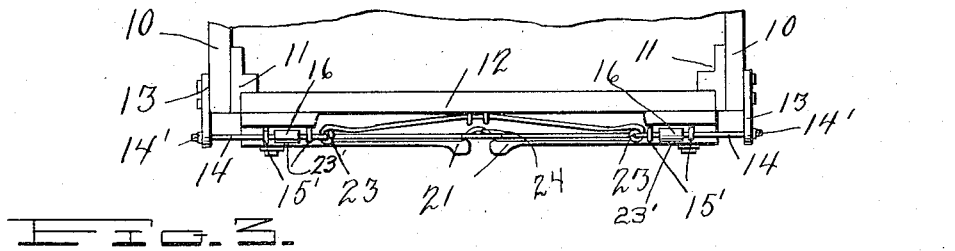
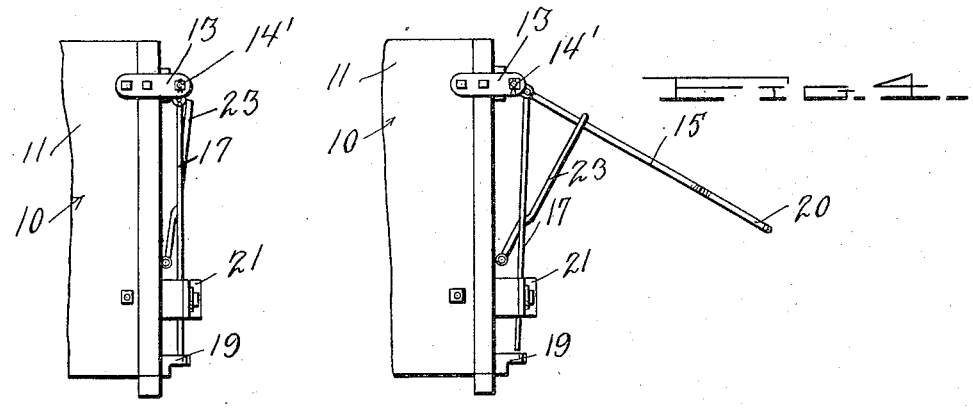
Witnesses
Arthur K Moore
Harry McTest
Inventor
T. Ryan
By
Attorneys

UNITED STATES PATENT OFFICE.

THOMAS RYAN, OF CHURDAN, IOWA.

WAGON END-GATE.

1,156,182.  Specification of Letters Patent.  Patented Oct. 12, 1915.

Application filed September 9, 1914. Serial No. 860,862.

*To all whom it may concern:*

Be it known that I, THOMAS RYAN, a citizen of the United States, residing at Churdan, in the county of Greene, State of Iowa, have invented certain new and useful Improvements in Wagon End-Gates; and I do hereby declare the following to be a full, clear, and exact description of the invention, such as will enable others skilled in the art to which it appertains to make and use the same.

This invention relates to improvements in wagon end gates, and particularly to end gates for use on wagons which are used for carrying grain.

The principal object of the invention is to provide a novel and efficient end gate which can be effectively held in closed position so as to prevent any escape of grain and which can be readily opened for removal of grain without permitting escape and consequent waste of grain.

Other objects and advantages will be apparent from the following description, when taken in connection with the accompanying drawings.

In the drawings: Figure 1 is an elevation of the end gate in closed position. Fig. 2 is a top plan view. Fig. 3 is a side elevation of the same in the position of Fig. 1. Fig. 4 is a side elevation showing the gate in open position.

Referring particularly to the accompanying drawings, 10 represents the sides of the wagon box, 11 the cleats against which the gate 12 bears. Mounted on the sides of the box near the upper ends are the rearwardly extending apertured brackets 13 in which are disposed the outer ends of the laterally directed portions 14 of the arms of a yoke 15. The inner ends of these portions 14 are rotatably mounted in eyes or brackets 15' carried by the gate 12 and adjustably held by the set screws 23'. Carried by each of the portions 14 between the brackets 15' are the collars 16 to each of which is pivotally connected the upper end of a locking bolt 17. To retain the upper ends of the bolts 17 in position in the collars 16, cotter pins 16' are passed through said portions. The lower portion of each of the locking bolts passes through a guide bracket 18 mounted on the gate and is adapted to engage in a smaller bracket 19 mounted on the wagon box below the gate. The lower central portion of the yoke is formed into a handle 20 and is arranged to be seated in a central recess formed in the plate 24, where it is held in normal position by the spring detents 21. Mounted centrally on the gate is a yoke 22 the arms of which are slotted longitudinally, as indicated at 23 and receive slidably therein the arms of the yoke 15.

When the handle is pulled outwardly from the detents, and swung upwardly, the sleeves 16 which are secured to the portions 14, will rotate with the portions 14 and raise the bolts 17 out of engagement with the brackets 19. Further upward movement of the yoke 15 will engage the end walls of the slots 23 and exert pull on the yoke 22 so that the gate will be swung open on the members 14 as the axis.

The outer ends of the members 14 carry cotter pins 14' which secure them against longitudinal movement through the brackets 13. This serves to effectively hold the sides of the box longitudinally in proper spaced relation when the weight of the grain slides to the rear end of the box in dumping the same. The bracket 18 is formed with a central recess which receives the recessed portion of the plate 24.

What is claimed is:

The combination with a wagon box, of an end gate mounted therein, apertured brackets mounted on the sides of the box, a yoke movably mounted on the gate and having laterally directed portions formed on the arms thereof disposed in the apertured brackets, sleeves rigidly mounted on the laterally directed portions, vertically movable locking bolts pivotally carried by the sleeves, a guide bracket carried by the gate and receiving the said locking bolts therethrough, said bracket having a central recess for the reception of a portion of the said yoke, brackets carried by the box below the gate for the reception of the bolts, a yoke carried by the gate and operatively engaged with the first named yoke, and detent members carried by the guide bracket for retaining the first yoke in the recess.

In testimony whereof I affix my signature in the presence of two witnesses.

THOMAS RYAN.

Witnesses:
J. J. CONNERS,
V FATESRAEEN.

Copies of this patent may be obtained for five cents each, by addressing the "Commissioner of Patents, Washington, D. C."